United States Patent
Riordan

(10) Patent No.: US 10,857,069 B2
(45) Date of Patent: Dec. 8, 2020

(54) MEDICINE CUP WITH INFECTION CONTROL TAB

(71) Applicant: Dennis Christopher Riordan, New City, NY (US)

(72) Inventor: Dennis Christopher Riordan, New City, NY (US)

(\*) Notice: Subject to any disclaimer, the term of this patent is extended or adjusted under 35 U.S.C. 154(b) by 143 days.

(21) Appl. No.: 14/933,127

(22) Filed: Nov. 5, 2015

(65) Prior Publication Data

US 2016/0067145 A1    Mar. 10, 2016

Related U.S. Application Data

(60) Division of application No. 14/181,592, filed on Feb. 14, 2014, now abandoned, which is a
(Continued)

(51) Int. Cl.
*A61J 7/00* (2006.01)
*B65D 3/28* (2006.01)
(Continued)

(52) U.S. Cl.
CPC .............. *A61J 7/0046* (2013.01); *B65B 61/14* (2013.01); *B65D 3/28* (2013.01); *B65D 17/34* (2018.01);
(Continued)

(58) Field of Classification Search
CPC ....... B65B 61/14; A61J 7/0046; A61J 7/0076; B65D 2525/285; B65D 17/34; B65D 17/347; B65D 17/40; B65D 25/282; B65D 25/2888; B65D 5/4612; A47G 19/2266; A47G 33/002
(Continued)

(56) References Cited

U.S. PATENT DOCUMENTS 1,053,272 A * 2/1913 Wilson ............... B65D 3/28
229/402
1,810,806 A * 6/1931 Wilson ............... B65D 3/06
229/400
(Continued)

FOREIGN PATENT DOCUMENTS

CN     201135615 Y    10/2008

OTHER PUBLICATIONS

Kampf et al, Hand Hygiene for the Prevention of Nosocomial Infections, Dtsch Arztebl Int 2009; 106(40); 649-655.
(Continued)

*Primary Examiner* — Fenn C Mathew
*Assistant Examiner* — Jennifer Castriotta
(74) *Attorney, Agent, or Firm* — Michael E. Zall

(57) ABSTRACT

A medicine cup, preferably stackable, disposable, of frustoconical configuration and optionally biodegradable. The medicine cup includes a cup member for the medicine and an infection control tab coupled to the cup member. The tab is preferably coplanar with and integrally mounted to the sidewall of the cup member and has a textured frictional surface. The infection control tab is for holding the cup by the health care provider, the tab minimizing the possibility of contamination of the cup and patient through the health care provider's hands.

12 Claims, 18 Drawing Sheets

Related U.S. Application Data continuation-in-part of application No. 29/471,142, filed on Oct. 29, 2013, now Pat. No. Des. 729,932.

(60) Provisional application No. 61/858,502, filed on Jul. 25, 2013.

(51) Int. Cl.
 *B65D 17/34* (2006.01)
 *B65D 25/28* (2006.01)
 *B65B 61/14* (2006.01)

(52) U.S. Cl.
 CPC ....... *B65D 25/282* (2013.01); *B65D 25/2888* (2013.01); *A61J 7/0076* (2013.01); *A61J 2200/76* (2013.01); *B65D 2525/285* (2013.01); *Y02W 90/10* (2015.05)

(58) Field of Classification Search
 USPC ............. 206/515; 73/426; 604/78; 229/402; 215/DIG. 3
 See application file for complete search history.

(56) References Cited

U.S. PATENT DOCUMENTS

| | | | |
|---|---|---|---|
| 2,102,510 A * | 12/1937 | Cecil, II | B65D 3/28 229/117.12 |
| 2,659,527 A | 11/1953 | Liebenow | |
| 2,775,382 A | 12/1956 | Kayat | |
| 2,868,434 A | 1/1959 | Jones | |
| 3,090,542 A | 5/1963 | Miller | |
| 4,244,920 A | 1/1981 | Manschot et al. | |
| D258,311 S | 2/1981 | Peterson | |
| 4,373,640 A * | 2/1983 | Resio | A61J 7/0023 215/228 |
| 4,412,644 A | 11/1983 | La Fever | |
| 4,685,583 A | 8/1987 | Noon | |
| 4,940,189 A * | 7/1990 | Cremonese | B65D 5/008 141/337 |
| D340,768 S | 10/1993 | Jabour | |
| D359,883 S | 7/1995 | Suarez | |
| 5,445,023 A * | 8/1995 | Reed | G01F 19/002 73/426 |
| 5,655,805 A | 8/1997 | Shaddy | |
| D404,663 S | 1/1999 | Prindle | |
| 6,126,305 A | 10/2000 | Schaper et al. | |
| D440,501 S | 4/2001 | Dorion et al. | |
| 6,305,033 B1 | 10/2001 | Azzam | |
| 6,308,859 B1 | 10/2001 | Johnson | |
| 6,443,325 B1 | 9/2002 | Schaper et al. | |
| 6,485,691 B1 | 11/2002 | Jones | |
| 6,527,169 B2 | 3/2003 | Kim | |
| 6,562,270 B1 | 5/2003 | Gannon et al. | |
| 6,616,033 B1 | 9/2003 | Schein | |
| 6,667,010 B2 | 12/2003 | Kuchar | |
| 6,719,951 B1 | 4/2004 | Griffith | |
| 6,889,860 B2 | 5/2005 | Mazzarolo | |
| D545,626 S | 7/2007 | Frank | |
| D579,557 S | 10/2008 | Washington | |
| 7,992,766 B2 | 8/2011 | Seo | |
| 8,210,392 B2 | 7/2012 | Kang et al. | |
| 8,381,935 B1 | 2/2013 | Buck | |
| 2001/0004080 A1 * | 6/2001 | Cutler | A47G 19/2266 220/703 |
| 2005/0092641 A1 * | 5/2005 | Marsden | B65D 25/56 206/438 |
| 2005/0121456 A1 | 6/2005 | Cutler et al. | |
| 2005/0247129 A1 * | 11/2005 | Carragan | G01F 19/00 73/426 |
| 2010/0136209 A1 * | 6/2010 | Ou-Yang | A61L 29/085 427/2.1 |
| 2010/0254637 A1 * | 10/2010 | Lesko | B65D 75/5811 383/209 |
| 2012/0074155 A1 | 3/2012 | Yeung | |

OTHER PUBLICATIONS

Alibaba.com, pp medicine cup promotion, date unknown.
Saloojee, The Health Professional's Role in Preventing Nosocomial Infections, Postgrad Med J 2001; 77:16-19.
Inweregbu et al, Nosocomial Infections, Continuing Education in Anesthesia, Critical Care & Pain, vol. 5, No. 1, 2005, pp. 14-17.
Reed et al, Infection Control and Prevention: A Review of Hospital-Acquired Infections and the Exconomic Implications; The Oschner Journal 9:27-31, Spring 2009; pp. 27-31.

\* cited by examiner

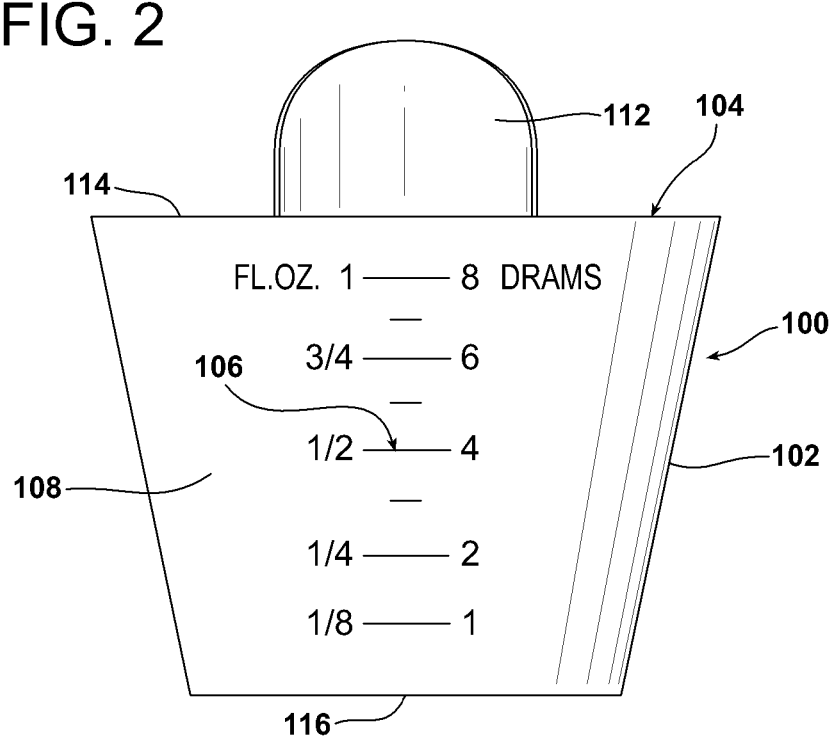
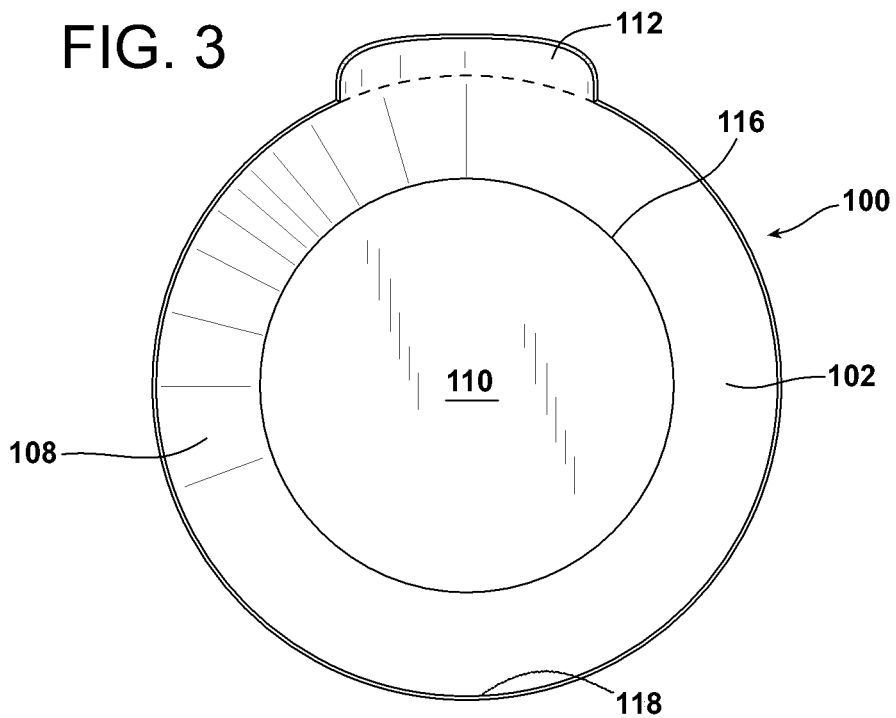

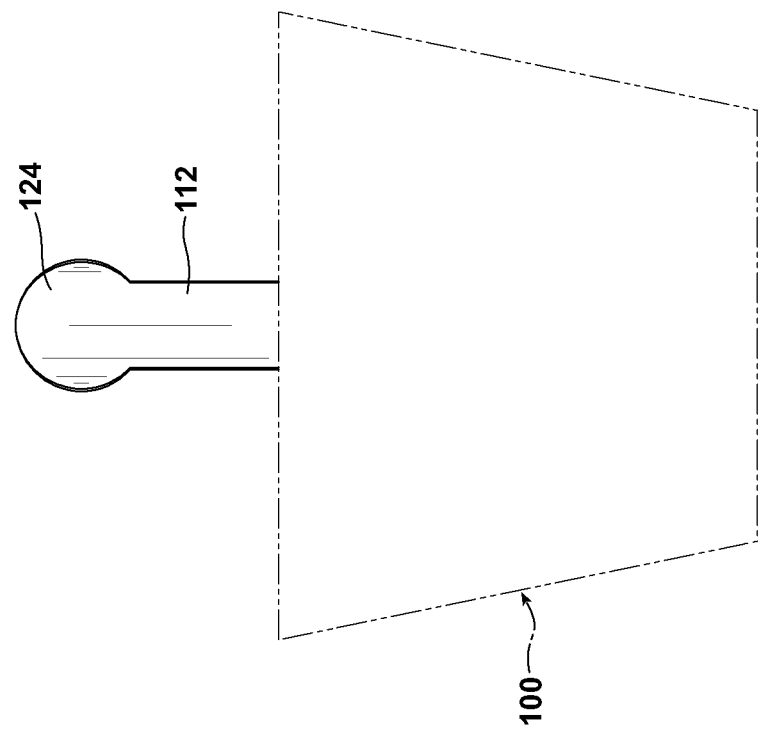
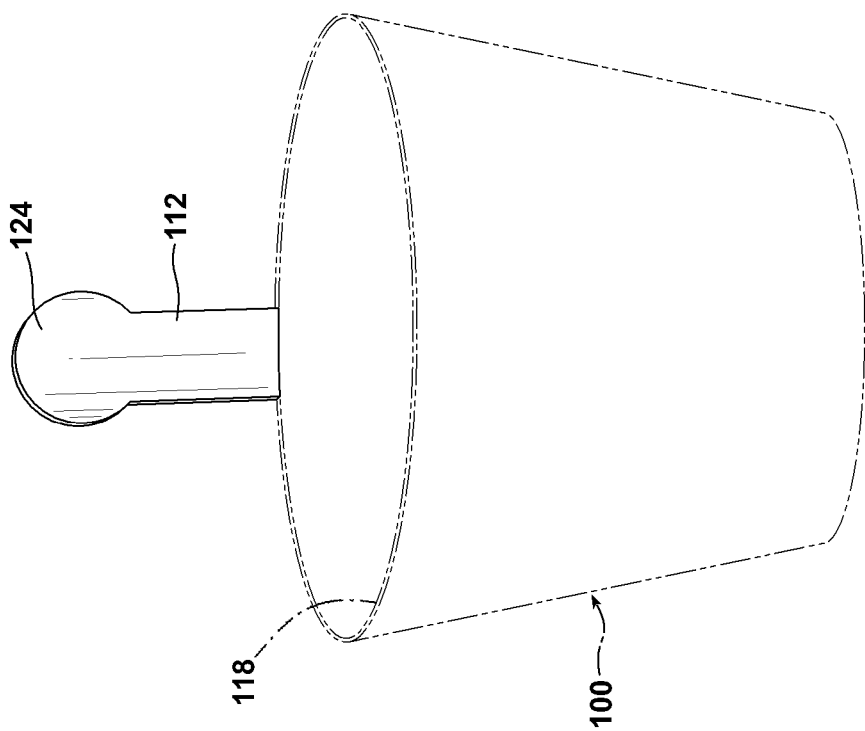

US 10,857,069 B2

MEDICINE CUP WITH INFECTION CONTROL TAB

RELATED APPLICATIONS

This application is a Non-Provisional Patent Application claiming priority of Provisional Patent Application 61/858,502 filed on Jul. 25, 2013 and a Continuation-in-Part application of U.S. Ser. No 29/471,142 filed on Oct. 29, 2013, now U.S. D729,932 issued on May 19, 2015, the entire disclosure of both of these applications are incorporated herein by reference.

FIELD OF THE INVENTION

This invention relates to medicine cups, preferably disposable cups, with an infection control tab to reduce the possibility of transmission of infections from a health care provider to a patient when the health care provider uses a medicine cup to administer medications.

BACKGROUND OF THE INVENTION

Nosocomial infections are infections that usually occur within 48 hours of hospital admission or several days after discharge from a hospital. Such infections affect numerous patients and result in a substantial number of deaths, extended hospital stays and excessive costs for such hospitalization. The Centers for Disease Control and Prevention estimates that 2 million patients suffer from hospital-acquired infections every year and nearly 100,000 of them die. Gram-positive bacteria are the commonest cause of nosocomial infections with *Staphylococcus aureus* being the predominant pathogen. There has been an increase in the rate of antibiotic resistant bacteria associated with nosocomial infections in ICU.

Methicillin-resistant *Staphylococcus aureus* (MRSA), *Clostridium difficile*, and vancomycin-resistant *Enterococcus* (VRE) are bacteria that usually cause such hospital-acquired infections. It is believed that poor hand hygiene is responsible for 40% of infections transmitted in hospitals. Surveys have shown that the improvement in compliance with hand washing reduces nosocomial infection. Accessibility of the hand washing stations and the use of alcohol gels improves compliance with hand washing. However, at many hospitals and clinics, particularly in developing countries, hand wash basins are not easily accessible and are not adequately supplied with soaps, sprays, disinfectants and hand towels.

Not surprisingly, the health care providers in the hospital believe that they wash their hands more often than they actually do, and they also overestimate the duration of hand washing. Despite their best intentions, health care providers act as vectors of disease, disseminating new infections among their unsuspecting patients.

The wearing of protective gloves can be used in various clinical situations in order to prevent gross soiling or contamination. The availability of gloves directly at the bedside of the patient can significantly reduce the incidence of *Clostridium difficile*-associated diarrhea (CDAD). The hands should also be disinfected when protective gloves are removed, because in contrast to surgical gloves, ordinary protective gloves are often permeable to pathogens. Possible microbial contamination of hands and transmission of infection has been reported despite gloves being worn. This may also be due to the hands coming into contact with the potentially contaminated outer surface of the gloves during removal. Studies have found that despite the use of gloves pathogens could be found on the hands of staff involved in treatment. For gloves to be used in a clinical environment, such gloves must be readily available. This is not always the case at many clinics and hospitals in poorer settings.

Hand disinfection is indicated in almost all interactions of health care providers with patients. For example, the hands should be disinfected after direct patient contact (measurement of vital functions, auscultation, and palpation) or after contact with potentially infectious materials, e.g., bandages. Hygienic hand disinfection can make a substantial contribution to preventing infections if consistently performed. Thus, improvement of hand hygiene, with the aim of minimizing nosocomial infection, is a high priority. However, as indicated this is not always practical, possible or accomplished by the health care provider.

Unfortunately, for numerous reasons, the overall rate of compliance in hand hygiene is poor, only 50% on average. See, KAMPF et al, Hand Hygiene for the Prevention of Nosocomial Infections, *Dtsch Arztebl Int* 2009; 106(40); 649-655 (NPD1); SALOOJEE, The Health Professional's Role in Preventing Nosocomial Infections, *Postgrad Med J* 2001; 77:16-19 (NPD3); INWEREGBU et al, Nosocomial Infections, *Continuing Education in Anesthesia, Critical Care & Pain*, Volume 5, Number 1, 2005, pp 14-17 (NPD4); and REED et al, Infection Control and Prevention: *A Review of Hospital-Acquired Infections and the Economic Implications*; The Oschner Journal 9:27-31, Spring 2009; pp. 27-31 (NPD5)

Disposable medicine dispensing cups are well known and widely used. However, it is difficult to pass medication to a patient using these cups without touching the rim, inside of the cup or outside of the cup during delivery to the patient. This substantially increases the risk of contamination and the consequences therefrom.

Applicant is aware of the following references:

US Pub 2012/0074155 Yeung describes a holder for cups. The holder securely carries a single removable cup by providing an interference fit that increases with the weight of the contents carried. The holders can be stacked in an offset fashion by inserting the handle of one unit into the vertical hollow in the handle of the next unit.

US Pub 2005/0121456 Cutler et al describes a cup for dispensing liquid and solid medication. The cup has a ramp forming a mouth piece to the cup. The cup allows an individual to consume the entire contents within the cup without moving the head or neck backwards.

US Patent No 2005/0247129 Carragan describes a biodegradable measuring cup having indicia denoting a volume of a portion of the measuring cavity. The cup has handle for grasping of the cup for enabling a volume of material to be scooped into the measuring cavity.

U.S. Pat. No. 8,381,935 to Buck describes cup lid with integrated food and beverage container(s) that couples with the top of a cup.

U.S. Pat. No. 8,210,392 to Kang describes a beverage cup sleeve configured to provide multiple grip handles and additional layering for thermal buffering through reconfigurable handles.

U.S. Pat. No. 7,992,766 to Seo describes a paper beverage cup with a hand grip having a hand grip attached to an outer wall of the cup body and a pair of ring-shaped portions.

U.S. Pat. No. 6,889,860 to Mazzarolo describes a plastic drink-through lid.

U.S. Pat. No. 6,719,951 to Griffith describes a urine specimen collection assembly for more easily and sanitarily collecting a urine sample. The assembly includes a cup for collecting the urine specimen and a removable elongated handle coupled to the cup member for holding by a user to support the cup member in an appropriate position for collection of the urine sample.

U.S. Pat. No. 6,667,010 to Kuchar describes an apparatus for collecting a biological fluid specimen. The apparatus includes a holder which includes a ring which is removably engagable with a specimen container.

U.S. Pat. No. 6,616,033 to Schein describes a disposable beverage container that is a thin-walled container having an integral sealing flap and has a truncated conical shape.

U.S. Pat. No. 6,527,169 to Kim describes a paper beverage cup having an integral handle formed in the middle of the sidewall of the cup.

U.S. Pat. No. 6,485,691 to Jones describes a specimen gathering device permitting a person to position the specimen gathering device without contact with the specimen. The device includes a container member having an overlying lid and detachable handle assembly diametrically overlying the lid and forming a lever for tightening and loosening the lid. Releasable gripping members on the container wall, handle and lid permit manual separation of the handle and lid and supporting the container remote from a person's hand by one end portion of the handle.

U.S. Pat. Nos. 6,443,325 and 6,126,035 to Schaper et al describe a molded plastic beverage cup having a handle formed as an integral part of the cup.

U.S. Pat. No. 6,308,859 Johnson describes a communion cup for religious communion services that includes cup having a top rim and a handle connected to the body that extends upwards from the rim. The handle includes a manual grasping section such that a person can manually lift the communion cup from a serving tray by grasping the handle member at the grasping section.

U.S. Pat. No. 6,305,033 to Azzam describes a hand-held cuspidor which receives a replaceable cup in a holder. The holder has a handle for carrying the cuspidor.

U.S. Pat. No. 5,655,805 to Shaddy describes a cup holder that includes a ring and a handle mounted on the outer surface of the ring for supporting the ring and a cup held in the ring.

U.S. Pat. No. 4,685,583 to Noon describes a handle for a beverage cup fabricated from a thin, elongated strip of plastic, heavy paper, or similar flexible material.

U.S. Pat. No. 4,412,644 to La Fever describes a disposable paper drinking cup that flares outwardly downwardly to form a wide, non-tipping base and has an opening in the narrow upper end for dispensing the beverage therefrom, a reclosable tab on the upper end, and a pair of handles along a side of the cup for holding the cup by the user.

U.S. Pat. No. 4,244,920 to Manschott describes a specimen collection cup that has a cap to seal and close the opening in the cup. The cup and cap members each have an outer protective wall thereon extending past and covering the outermost extremities of the closure portions of the cup and cap members to protect the closure portions from hand and body contact and a handle appendage to hold while collecting a sample by the user.

U.S. Pat. No. 3,090,542 to Miller describes a lid or closure cap for use on a waxed paper beverage cup which may be readily restored to a closed position after a portion of the contents of the cup have been imbibed.

U.S. Pat. No. 2,868,434 to Jones describes a foldable handle for paper cups which is designed as to be folded into the recessed bottom of the cup, so that it will not change the shape of the cup in any way, and will not in any way interfere with the use of the cup in the vending machine and when in use is mounted to the sides of the cup.

U.S. Pat. No. 2,775,382 to Kayat describes a handle attachment for preformed paper beverage cups.

U.S. Pat. No. 2,659,527 to Liebenow describes a nestable paper beverage cup with a handle structure which comprises a pair of symmetrical and opposite curvedly contoured handle elements.

Additional references include:

U.S. Pat. No. D258,311 to Peterson shows a specimen collection cup.

U.S. Pat. No. D340,768 to Jabour shows a urine sample container.

U.S. Pat. No. D359,883 to Suarez shows a cup.

U.S. Pat. No. D404,663 to Prindle shows a measuring cup.

U.S. Pat. No. D440,501 to Dorion et al shows a measuring cup with a view window.

U.S. Pat. No. D545,626 to Frank shows a cup.

U.S. Pat. No. D 579,557 to Washington shows a urine collection cup.

CN 201135615Y to Wang describes spoon with a handle wherein the end of the spoon can measure the amount of liquid medicine to be taken.

None of the references teach or suggest the disposable cup of this invention and the advantages in using such cup.

OBJECTS AND SUMMARY OF THE INVENTION

In view of the foregoing disadvantages inherent in the known procedures and medicine cups, the present invention provides a novel medicine cup that can be utilized more easily and provide assistance in inhibiting the spread of infection.

It is an object of the present invention to provide a novel disposable medicine cup that may be easily grasped by the health care provider to deliver medicine to the patient and that assists in preventing infections.

Yet another object of the present invention is to provide a novel medicine cup, preferably disposable and optionally biodegradable, which includes a cup member for the medicine and an infection control tab coupled to the cup member for holding by the health care provider, the control tab minimizing the possibility of contamination of the cup and patient through the health care providers hands.

The medicine cup described and claimed herein achieves all of these objects.

Broadly, the medicine cup is for dispensing a pharmaceutical product to a patient requiring such product. The cup includes:

a. a cup including a surrounding sidewall, the sidewall including an upper edge and a bottom edge, b. a bottom wall mounted to the bottom edge of the sidewall configured to form the bottom surface of the cup;

c. the upper edge forming a top opening to the cup; and d. a tab, i.e., an infection control tab, attached to and projecting from a portion of the top edge of the surrounding sidewall configured to be grasped by two fingers of a person dispensing the pharmaceutical product.

More specifically, the preferred disposable medicine cup has a frustoconical configuration. The cup includes:

a. a closed circular base having an outer perimeter;

b. a conical shaped surrounding sidewall having a bottom perimeter edge joined to the outer perimeter of the circular base and a top perimeter edge, the sidewall extending upward and tapering outwardly from the outer perimeter of the base;

c. an infection control tab attached to and projecting from a portion of the top perimeter edge of the surrounding sidewall configured to be grasped by two fingers of a person dispensing the pharmaceutical product.

The person, dispensing the pharmaceutical product can grasp the infection control tab of the cup, place the pharmaceutical product therein through the opening in the cup and deliver the medicine cup to the patient for use. The fingers or hand of the person dispensing the pharmaceutical product do not touch the upper edge or sidewalls of the cup, thus minimizing the possible contamination of the cup and medicine to be transmitted to the patient.

BRIEF DESCRIPTION OF THE DRAWINGS

Further aspects, features and advantages of the present invention will become even more apparent with reference to the following detailed description and the accompanying drawings.

FIG. 2 is a front view of the first embodiment of the medicine cup and infection control tab therefore.

FIG. 3 is a top view of the first embodiment of the medicine cup and infection control tab therefore.

FIG. 23 is a front perspective view of a third embodiment of an infection control tab for a medicine cup.

FIG. 24 is a front view of the third embodiment of the infection control tab for a medicine cup.

The drawings are not presented to scale but are only used to illustrate the principles of the invention. In the drawings, like reference numbers indicate like elements.

DETAILED DESCRIPTION OF THE INVENTION

A detailed description of one or more embodiments is provided below along with accompanying figures that illustrate the principles of the embodiments. The scope of the embodiments is limited only by the claims and encompasses numerous alternatives, modifications and equivalents. Numerous specific details are set forth in the following description. These details are provided solely for the purposes of example and the embodiments may be practiced according to the claims without some or all of these, specific details.

Figure 35:
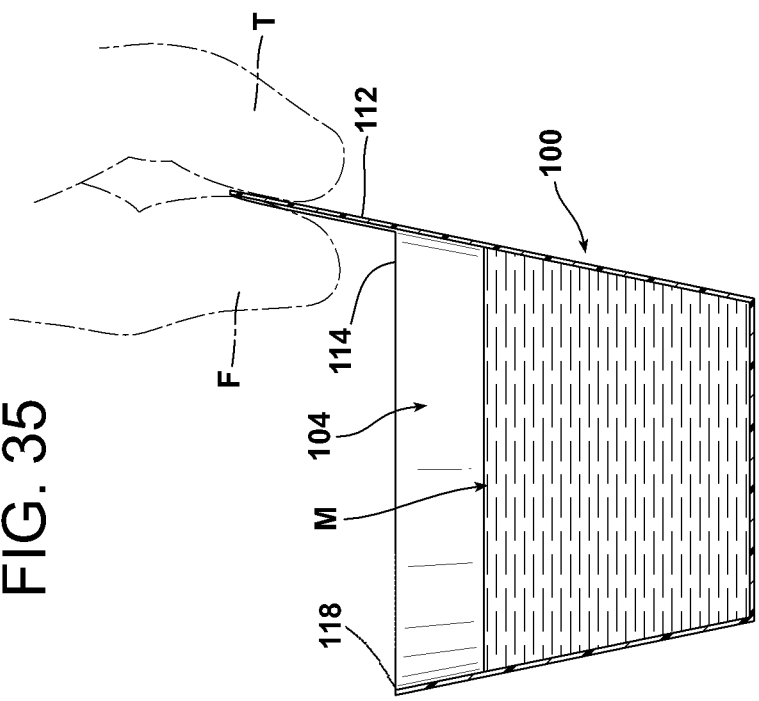
FIG. 35 is a cross sectional view of the medicine cup and infection control tab taken along line 35-35 of FIG. 34 depicting the dispensing of a liquid medicine therein.
Figure 36:
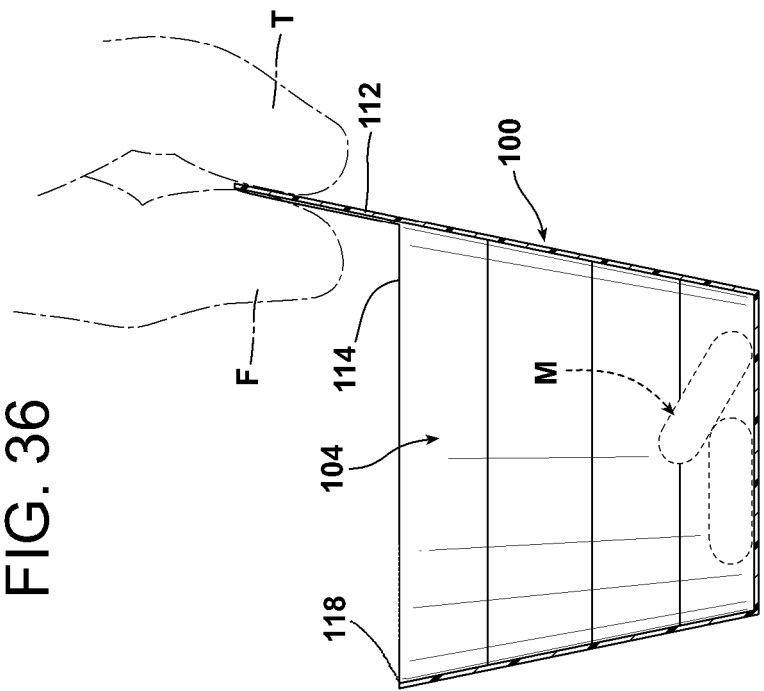
FIG. 36 is a similar cross sectional view of the medicine cup and infection control tab depicting the dispensing of pills therein.

Referring to the Figures, broadly the medicine cup 100 of this invention includes a cup body 102 having a cavity 104 for holding medicine M (FIG. 35 and FIG. 36) and includes indicia 106 thereon, typically volumetric measurement indicia. The medicine cup 100 includes a sidewall 108 and a bottom wall 110. As depicted a tab 112, i.e., an infection control tab 112, is integrally formed with the sidewall 108, e.g., a common piece of material. The infection, control tab 112 provides a means Tor grasping of the medicine cup 100 for placing medicine M therein and delivering the medicine M to the patient (FIGS. 35 and 36). Alternatively, the infection control tab 112 may be formed separately from the sidewall 108 and subsequently attached to the sidewall 108.

More specifically, the medicine cup 100 is used for dispensing a pharmaceutical product or medicine M to a patient requiring such product. Typically, as shown in FIGS. 35 and 36, the medicine M can be in liquid or pill form. At times it could be in powdered or a complex formulation prescribed by the health care provider.

The medicine cup 100 includes a surrounding sidewall 108, the sidewall 108 including an upper edge 114 and a bottom edge 116. The bottom wall 110 is mounted to the bottom edge 116 of the sidewall 108 configured to and forming the bottom surface of the cup 100. The upper edge 114 forms a top opening 118 to the cup 100, with the bottom wall 110 and sidewall 108 forming the cup cavity 104.

Figure 37:
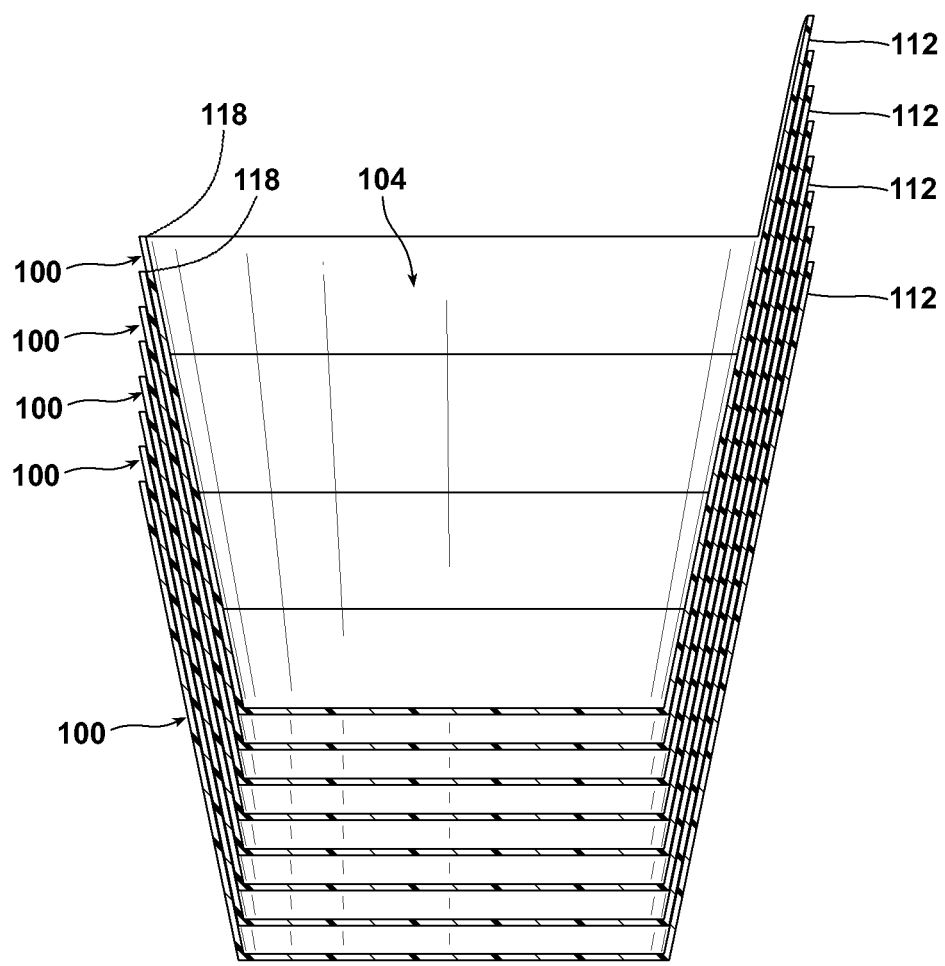
FIG. 37 is a cross sectional view of a plurality of medicine cups, each with an infection control tab, depicting the stacking of such cups for convenient packing and shipping.

The medicine cup 100 depicted in the Figures herein is configured as a frustum shaped medicine cup 100, and more specifically a frustoconical shaped medicine cup 100, to permit the cup 100 to be stacked within another identically shaped cup, i.e., see FIG. 37. The frustoconical configuration of the cups 100 consist of a closed circular base or bottom wall 110, a conical sidewall 108 that extends upward and tapers outward from the outer perimeter of the base 110, and an open, circular mouth or rim or upper edge 108. Such cups 100 are designed to stack within each other and can range in various sizes. Preferably, the medicine cup body 102 including the infection control tab 112 is stackable in a nested orientation within an identical other cup body, see FIG. 37.

Although this frustoconical shape is preferred and widely used, it should be understood that the medicine cup 100 can be any shape, and not necessarily a shape wherein one medicine cup 100 nests within each other. The medicine cup 100 may be square, rectangular, hexagonal oval, etc. in a cross sectional view (top view and/or side view), and does not necessarily need to be frustoconical or even frustum shaped. However, preferably, the top opening 118, bottom wall 110, and sidewall 108 are configured to permit the cup 100 to be stacked within an identically shaped cup 100, more preferably configured to a frustum shaped medical cup 100. Most preferably the medicine cup 100 is a frustoconical shaped medical cup 100 as depicted in the Figures, wherein the top opening 118 is a greater diameter D1 than the bottom wall 110 diameter D2 and the sidewall 108 is so configured to permit the cup 100 to be stacked within an identically shaped cup 100.

A tab 112, termed herein an infection control tab 112, is attached to and projecting from a portion of the upper edge 114 of the surrounding sidewall 108. As shown in FIGS. 35 and 36, and other Figures herein, the tab 112 is configured to be grasped by two fingers F, including the thumb T, of a person dispensing the pharmaceutical product M.

Preferably the infection control tab 112 is integrally mounted, attached or formed with the sidewall 108. By integral it is meant that the sidewall 108 and tab 112 are made of a common piece of material, e.g., plastic. Preferably, the medicine cup 100 is integrally molded or shaped from one material, e.g., plastic, to form the medicine cup 100.

Referring to FIGS. 8-11, 19-22, and 30-34, preferably the infection control tab 112 is provided with a roughened or a textured surface 120 to enhance the frictional grip of the fingers F. The Figures herein depict several optional textured, surfaces 120; however the specific design of the textured surface 120 is not critical to this invention. It should be deep enough (or raised enough) to enhance the grip of the fingers F on the tab 112, but not interfere with the function of the cup 100 or, for example, interfere with the stacking of the cups 100. As depicted, the textured surface 120 consists of symmetrical grooves and/or ridges. However, other type textured surfaces may be used. For example, a graphic indicia may be molded or engraved therein, e.g., cup serial number, company logo, words to indicate a use or warning, braille indicia, etc.

Figure 1:
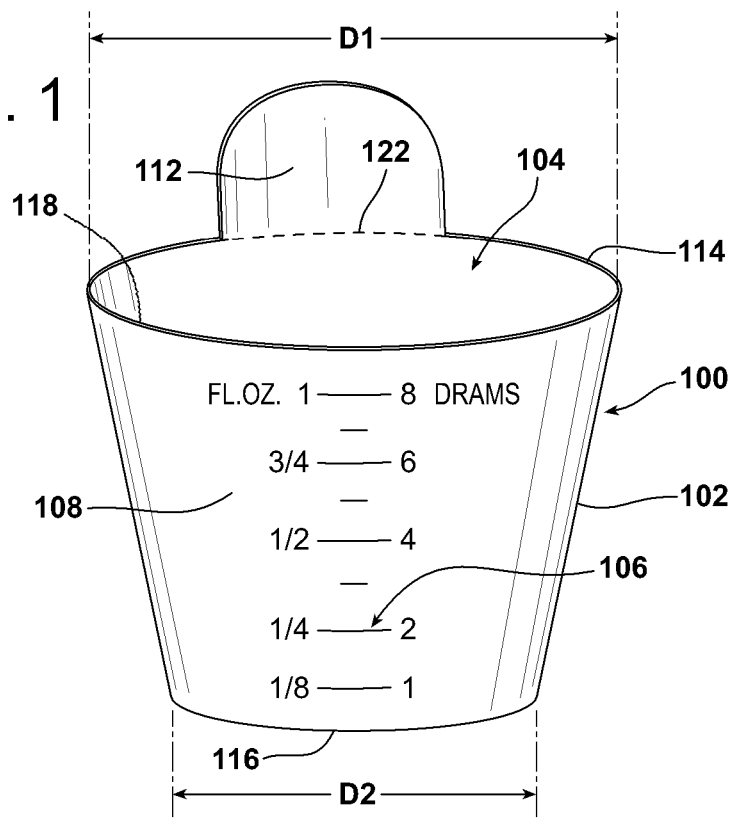
FIG. 1 is, a front perspective view of a first embodiment of a medicine cup and infection control tab therefore.
Figure 1A:
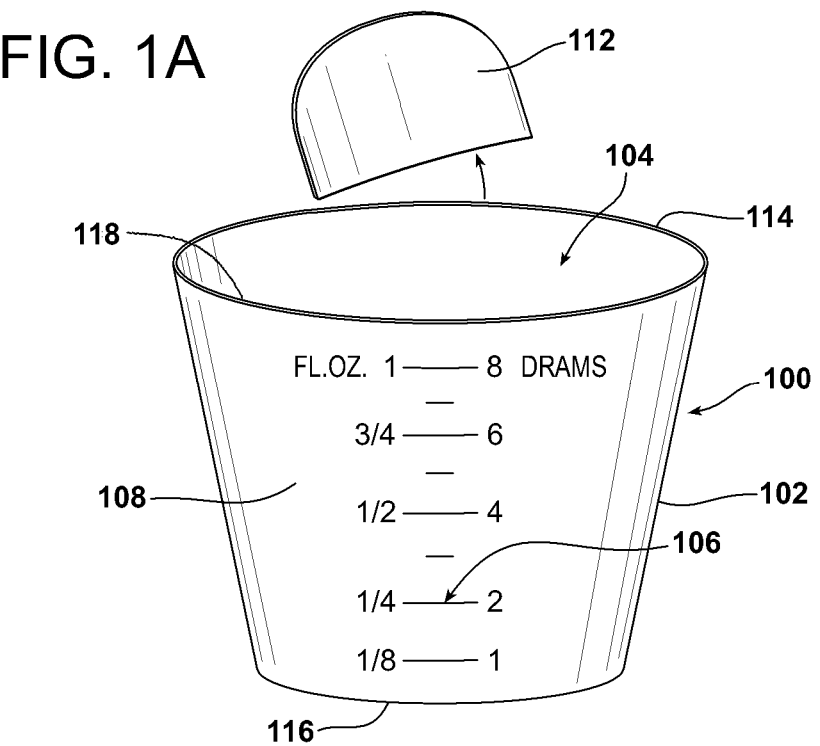
FIG. 1A is a front perspective view of the first embodiment of the medicine cup and infection control tab therefore and showing as an option, the tab being separated from the main body of the cup after use.
Figure 4:
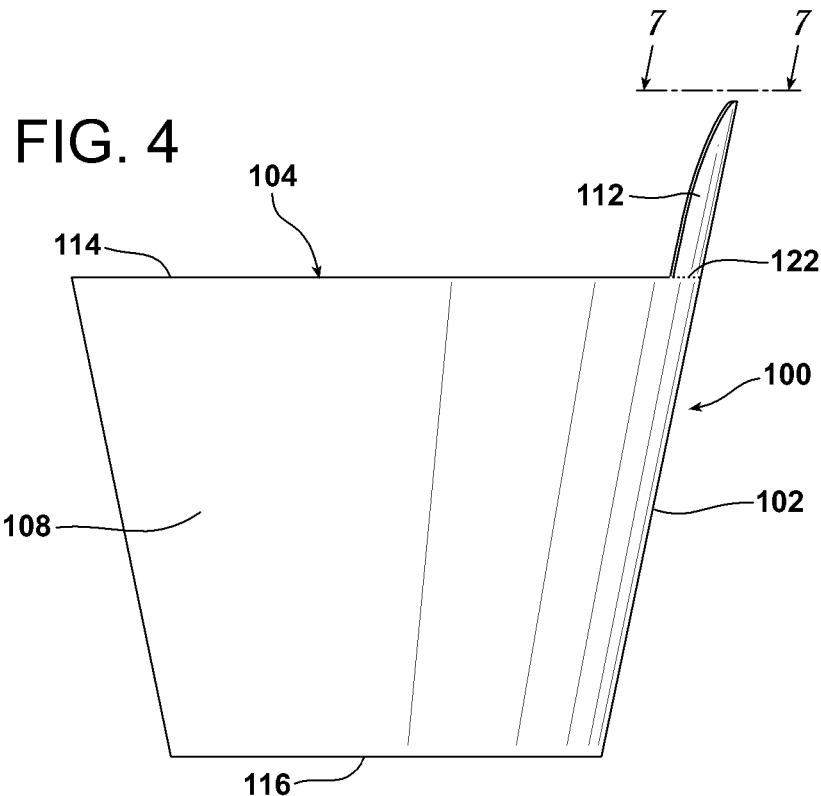
FIG. 4 is a right side view of the first embodiment of the medicine cup and infection control tab therefore, the left side view being identical thereto.
Figure 5:
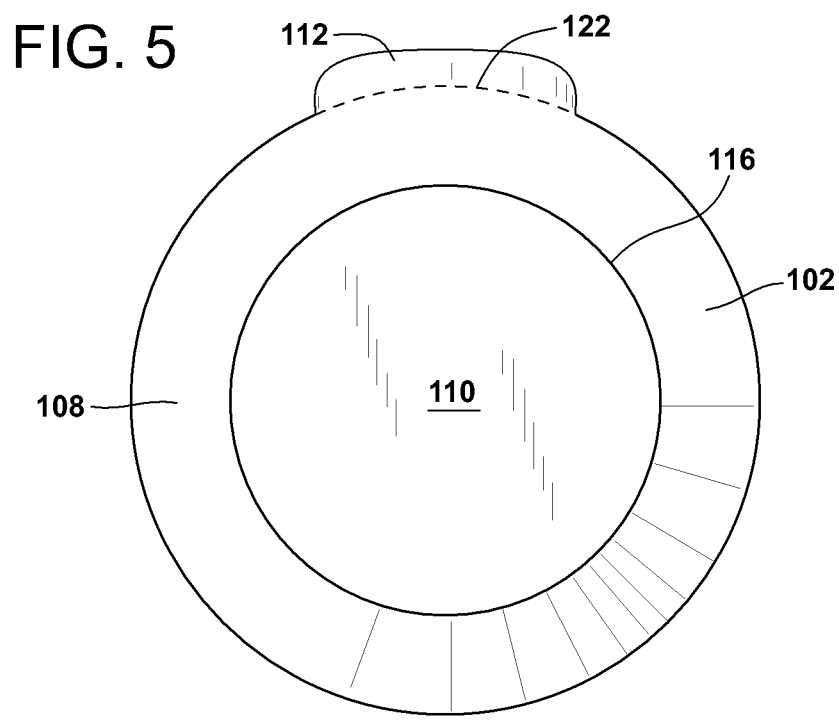
FIG. 5 is a bottom view of the first embodiment of the medicine cup and infection control tab therefore.
Figure 6:
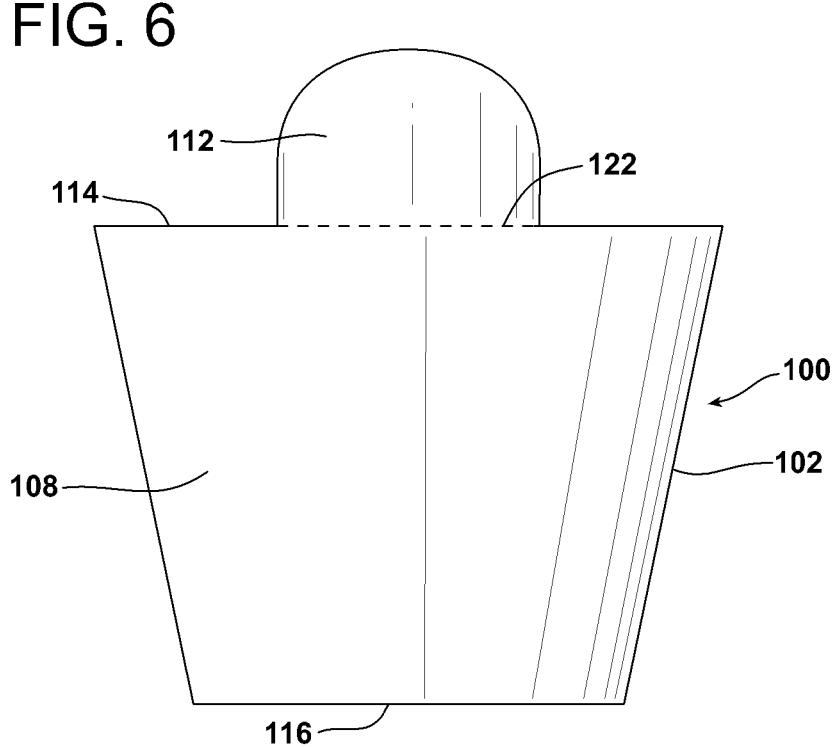
FIG. 6 is a rear view of the first embodiment of the medicine cup and infection control tab therefore.
Figure 7:
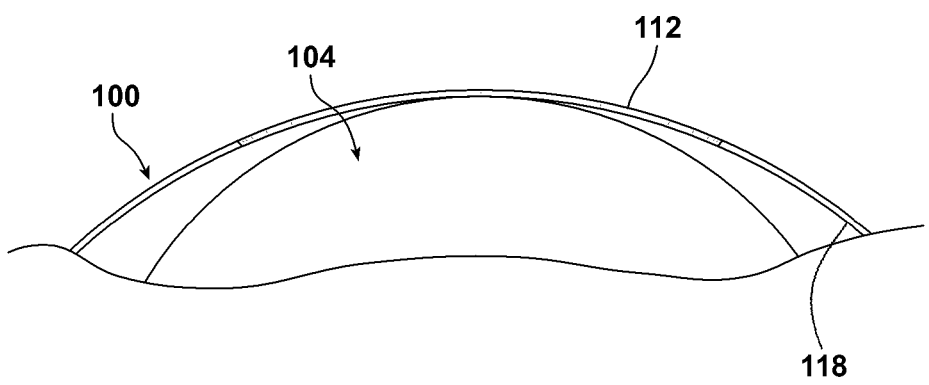
FIG. 7 is a top view of the first embodiment of the medicine cup and infection control tab therefore taken along the direction of 7-7 of FIG. 4.
Figure 8:
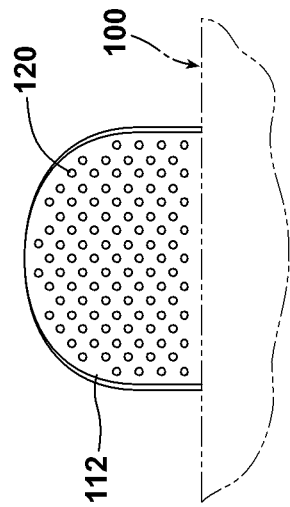
FIGS. 8-11 are front views of the front textured surface of the infection control tab used on the medicine cup of FIGS. 1-7 depicting four different such surfaces.
Figure 9:
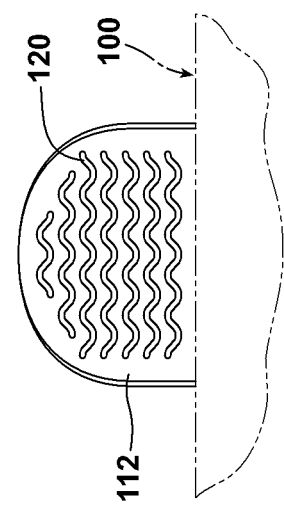
Figure 10:
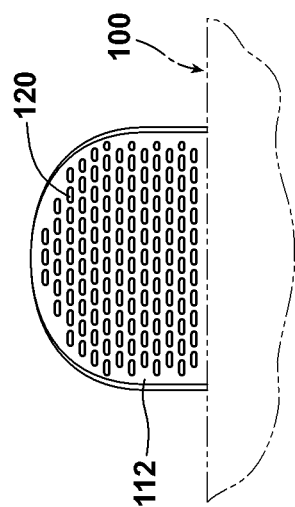
Figure 11:
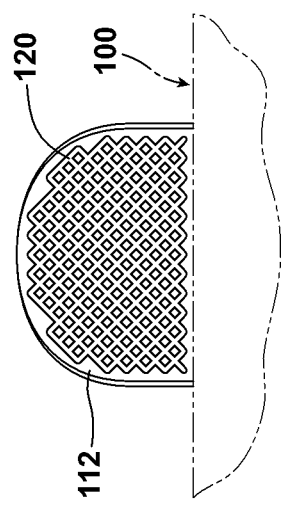
Figure 12:
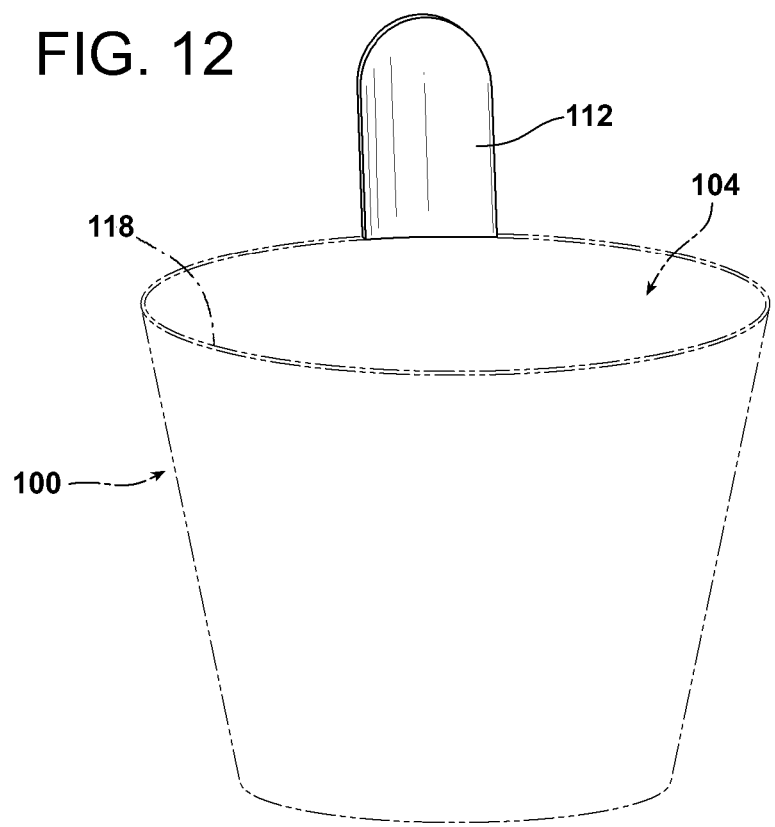
FIG. 12 is a front perspective view of a second embodiment of an infection control tab for a medicine cup.
Figure 13:
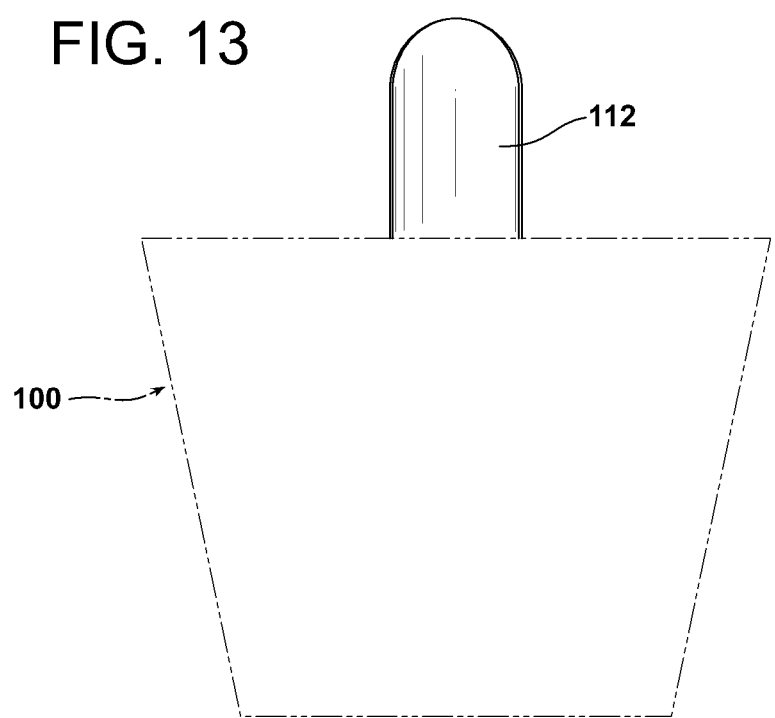
FIG. 13 is a front view of the second embodiment of the infection control tab for a medicine cup.
Figure 14:
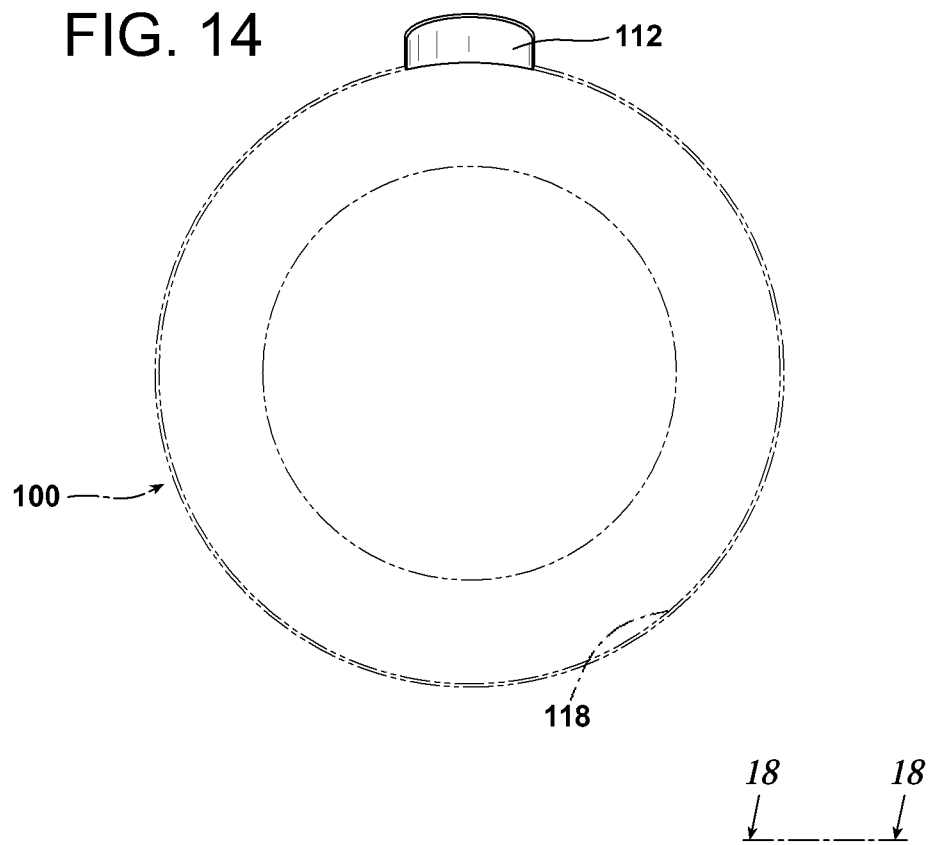
FIG. 14 is a top view of the second embodiment of the infection control tab for a medicine cup.
Figure 15:
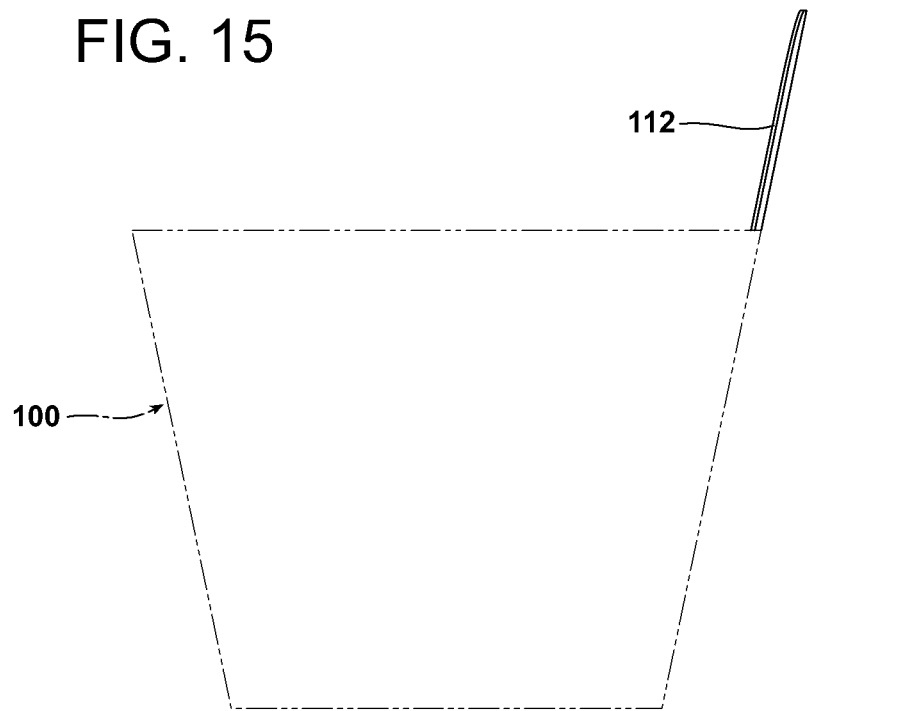
FIG. 15 is a right side view of the second embodiment of the infection control tab for a medicine cup, the left side view being identical thereto.
Figure 16:
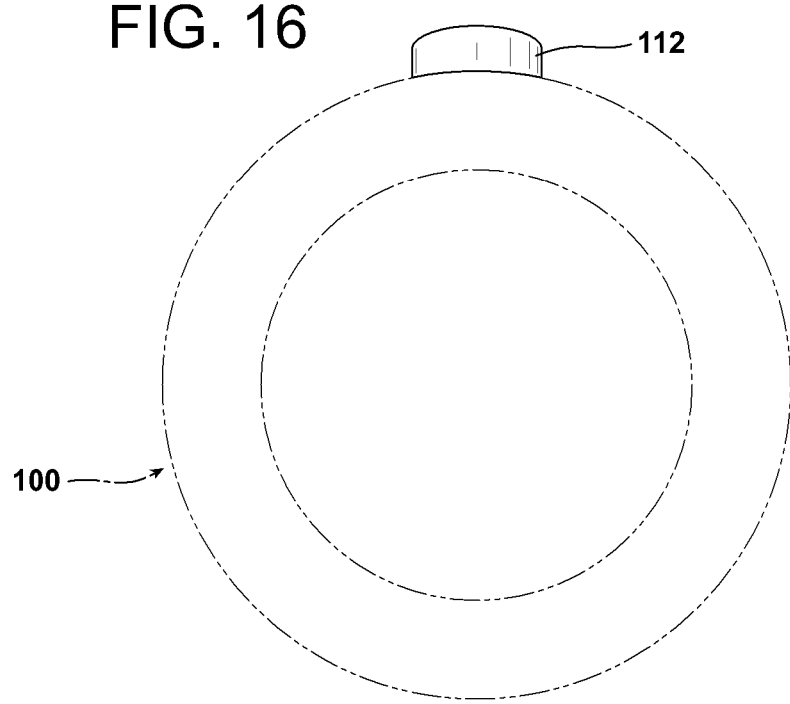
FIG. 16 is a bottom view of the second embodiment of the infection control tab for a medicine cup.
Figure 17:
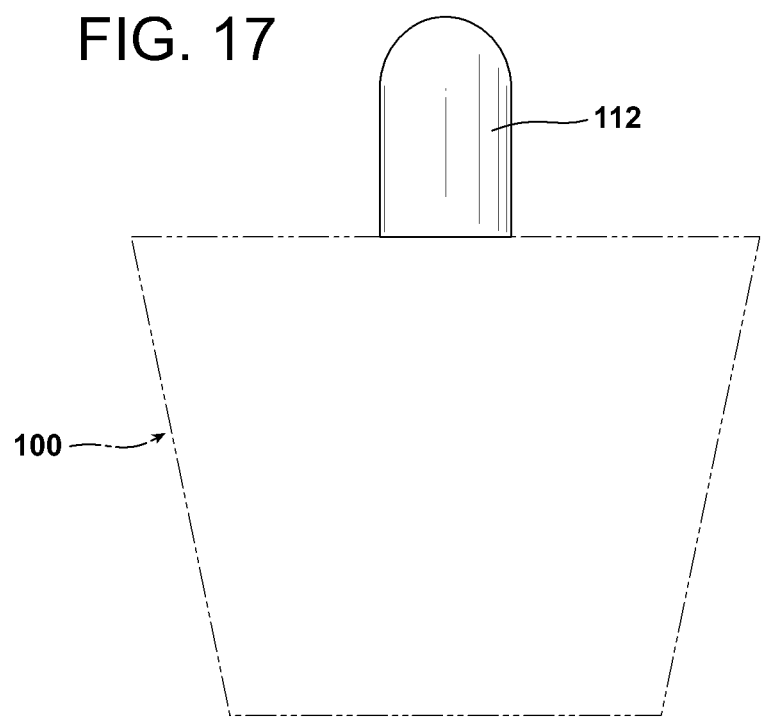
FIG. 17 is a rear view of the second embodiment of the infection control tab for a medicine cup.
Figure 18:
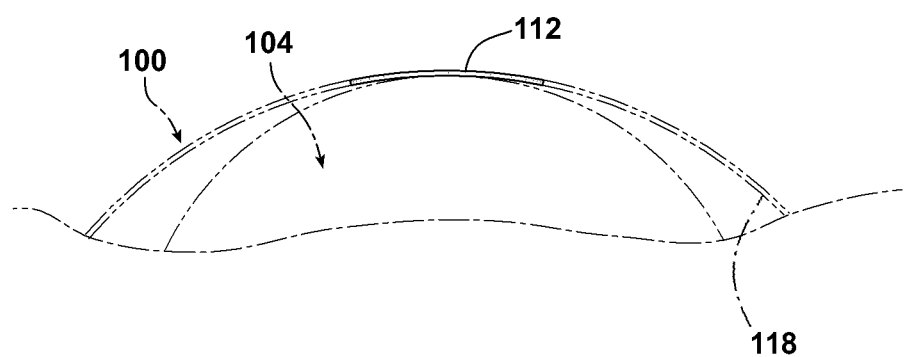
FIG. 18 is a top view of the second embodiment of the infection control tab of a medicine cup taken along the direction of 18-18 of FIG. 15.
Figure 19:
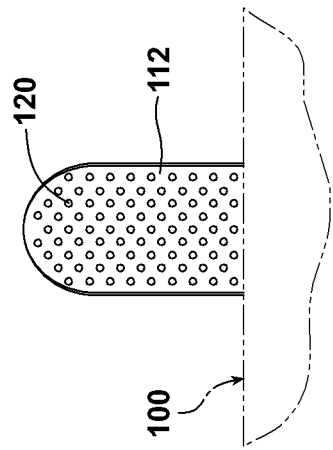
FIGS. 19-22 are front views of the front textured surface of the second embodiment of infection control tab used on, a medicine cup of FIGS. 12-18 depicting four different surfaces.
Figure 20:
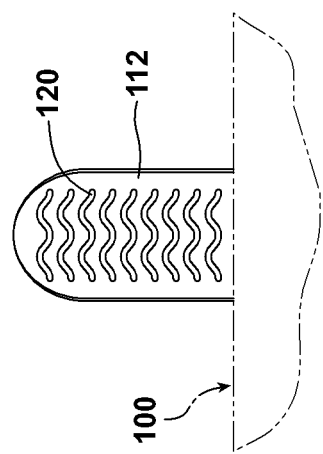
Figure 21:
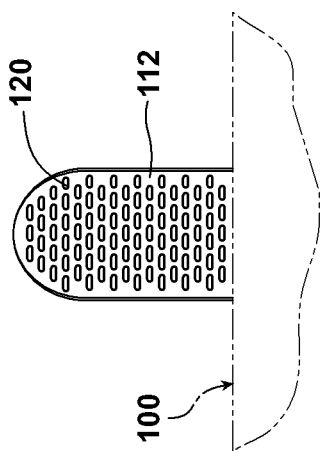
Figure 22:
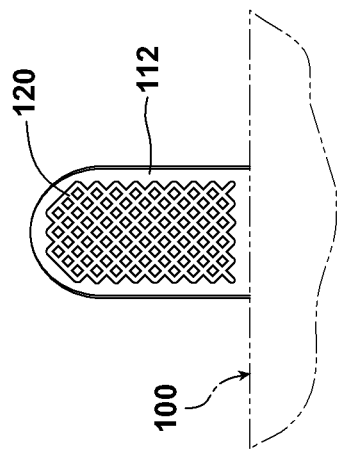
Figure 25:
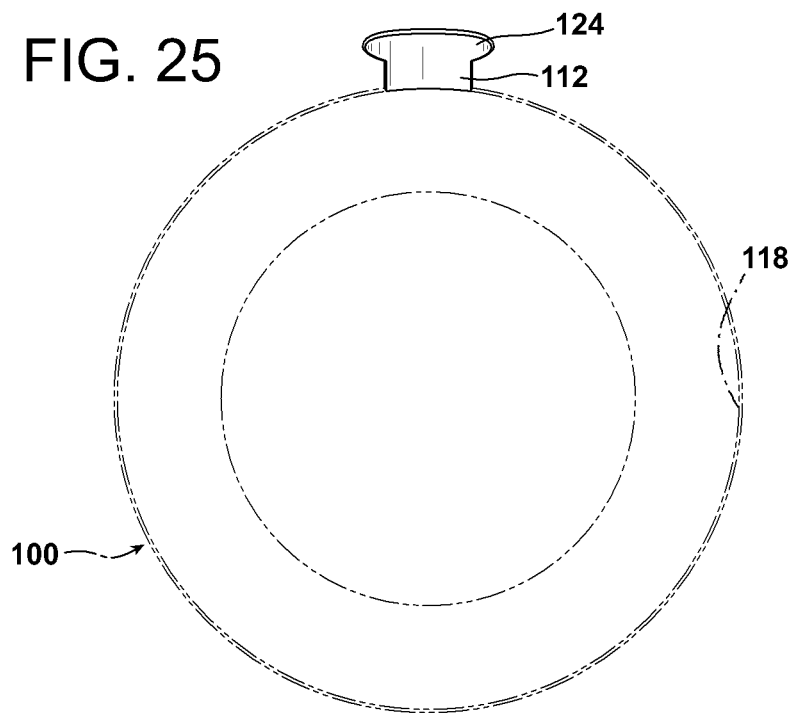
FIG. 25 is a top view of the third embodiment of the infection control tab for a medicine cup.
Figure 26:
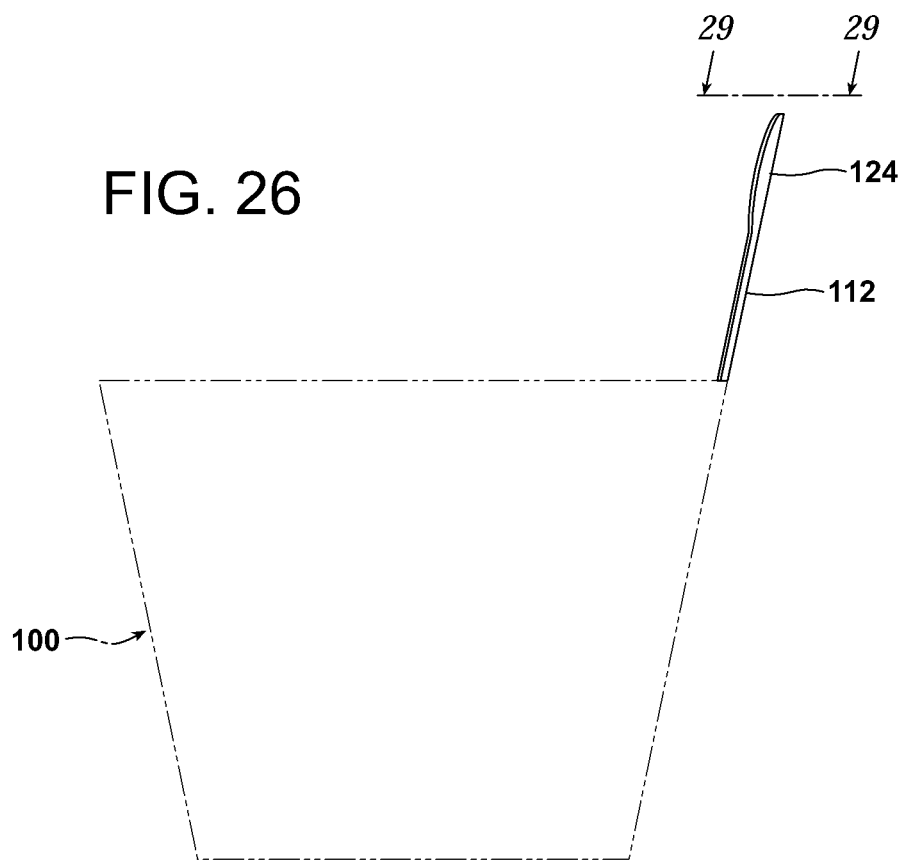
FIG. 26 is a right side view of the third embodiment of the infection control tab for a medicine cup, the left side view being identical thereto.
Figure 27:
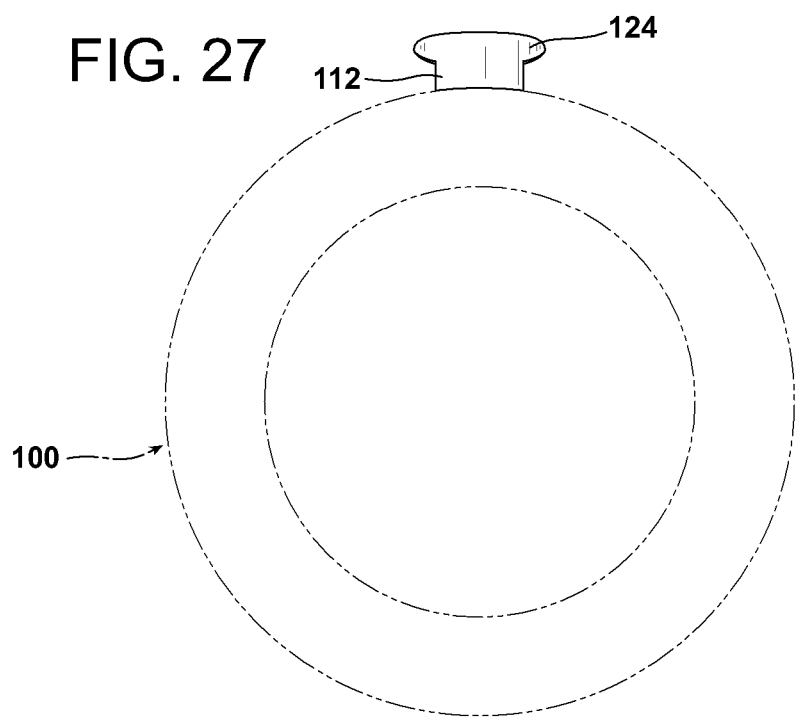
FIG. 27 is a bottom view of the third embodiment of the infection control tab for a medicine cup.
Figure 28:
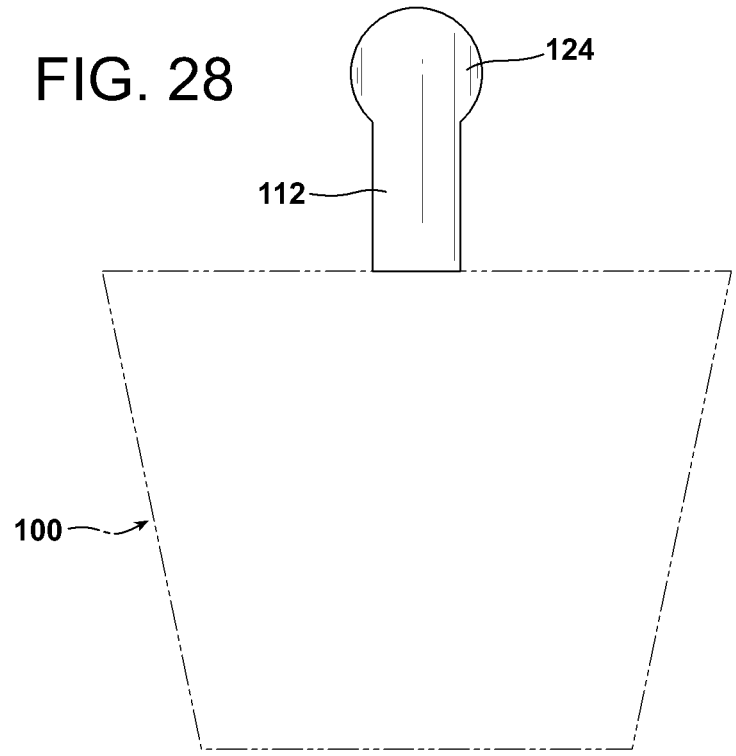
FIG. 28 is a rear view of the third embodiment of the infection control tab for a medicine cup.
Figure 29:
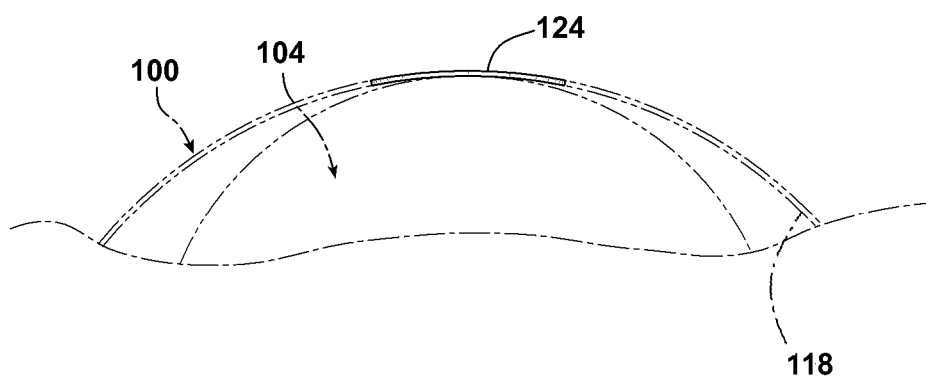
FIG. 29 is a top view of the third embodiment of the infection control tab of a medicine cup taken along the direction of 29-29 of FIG. 26.
Figure 30:
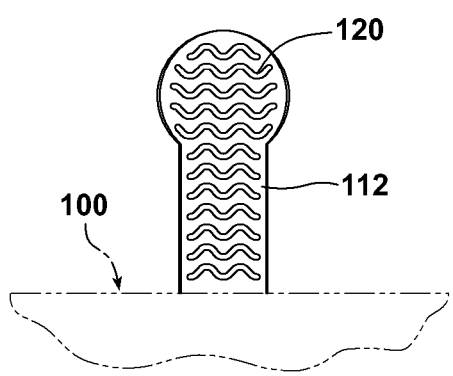
FIG. 30-33 are front views of the front textured surface of the third embodiment of infection control tab used on a medicine cup of FIGS. 23-29 depicting four different surfaces.
Figure 31:
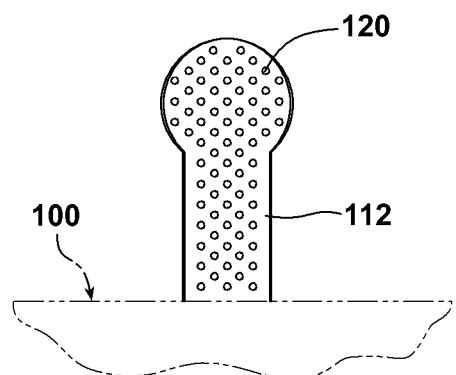
Figure 32:
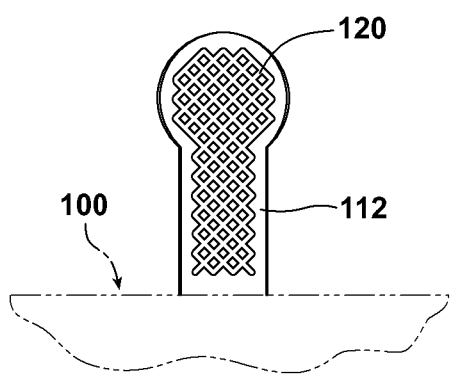
Figure 33:
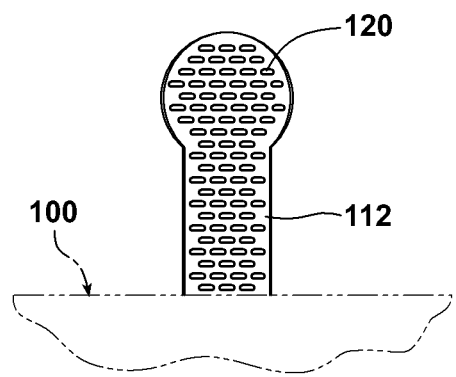
Figure 34:
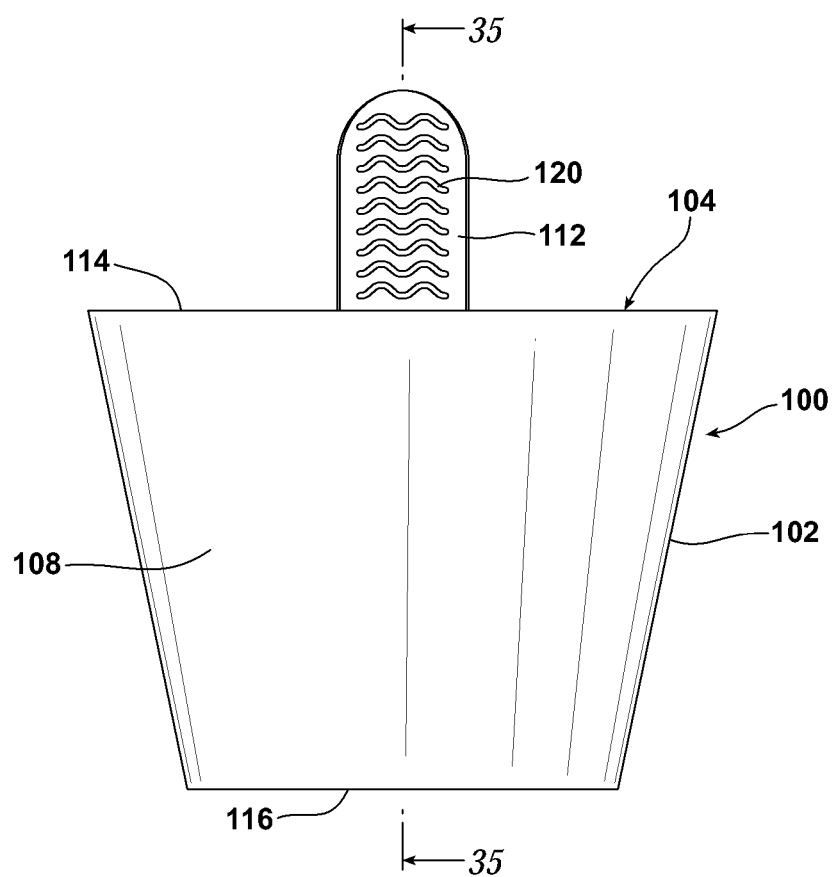
FIG. 34 is a front view of an embodiment of a medicine cup and infection control tab therefore.

Referring to FIG. 1A, optionally the infection control tab 112 is removable from the upper edge 114 of the sidewall 108 after use. For example, a score line or frangible score 122 is included at the juncture of the tab 112 and the upper edge 114 so that after use of the medicine cup 100 the tab is easily removed to indicate that it has been used and to prevent reuse of the cup 100.

Referring to the Figures, specifically FIGS. 4 & 7, 15 & 18, 26 & 29, the tab 112 is joined to the upper edge 114 and shaped to have the shape, e.g., curvature of the upper edge 114 and configured with the same shape as the sidewall 108 and extends in the same direction as the sidewall 108. In effect, the infection control tab 112 is an extension of the sidewall 108 and has the same shape, curvature and is coplanar with the sidewall 108. This enables the medicine cups 100 to be stacked and easily molded and shaped in manufacture.

The infection control tab 112 can have any number of shapes. For example:
FIGS. 1-11 depict a relatively short, broad thumb shaped tab 112;
FIGS. 12-22 depict a longer tab 112 which permits greater separation of the fingers F from the upper edge 114 of the sidewall 108.
FIGS. 23-33 depict a longer tab 112 which has a thumb or finger shaped end 124 to permit greater separation of the fingers F from the upper edge 114 of the sidewall 108 and greater gripping surface for the fingers F.

However, as indicated, regardless of the shape of the infection control tab 112, it is preferred that a textured surface 120 be included and/or that the infection control tab 112 be substantially coplanar with the portion of the sidewall 108 to which it is attached to permit stacking and efficient and inexpensive manufacture of the medicine cup 100.

Optionally, the infection control tab 112 can include includes an effective amount of an anti-infective agent to prevent contamination from pathogens. The anti-infective agent may be coated on the tab or included in the material from which the tab 112 is manufactured. By the use of the term pathogens it is meant any infectious agent that can cause disease, for example, Methicillin-resistant *Staphylococcus aureus* (MRSA), *Clostridium difficile*, and vancomycin-resistant *Enterococcus* (VRE) are bacteria that usually cause the hospital-acquired infections of concern herein.

As an example, the infection control tab 112 on a one (1) ounce medicine cup 100 the tab 112 as depicted in FIGS. 1-11 is thumbnail shaped, and is approximately 1.5 cm×1.5 cm.

The medicine cup 100 preferably has indicia denoting a volume in the cup cavity 104. Typically, such cups 100 come calibrated in from 1 to 8 drams, ⅛ to 1 fluid ounce, 1-2 tablespoons and 2.5 to 30 ml or cc. Graphic symbols, for example, measurements, bar codes, arrows and/or letters or any other informative element may be displayed on the cup 100. These can be printed thereon or molded or engraved therein. Graphical symbols and/or lettering may be placed on the sidewall 108, inside of the cup 100, or on the infection control tab 112 or in any other area. The graphical symbols may be included in the textured gripping surface 120 of the infection control tab 112 to not only provide information or indicia but to enhance the grip with the fingers F. Graphical symbols and/or lettering may include logos, advertisements, bar codes, or any other type of information that is viewable and may include tactile information including Braille for patients (or even health care providers) that may have impaired vision.

The cups 100 of this invention may be constructed by vacuum, thermal or injection molding techniques or in any other manner as desired. Cup 100 materials may be chosen for strength and function as required. Common thermosetting polymers that may be used include epoxy and phenolic materials. Thermoplastic materials that may be used, for example, include polypropylene, nylon, polyethylene and polystyrene. Alternatively, the cups 100 may utilize paper, hard-molded plastic, ceramic, metal (for example, stainless steel), and silicon. Alternatively, the cups 100 may be formed from glass, crystal, metal, or any other conventional material. Optionally, the disposable medicine cup 100 can be formed from a biodegradable material, e.g., a paper-based material such as Kraft paper and cardboard.

In use, the person, e.g., healthcare provider, dispensing the pharmaceutical product M grasps the infection control tab 112, places the pharmaceutical product M therein through the opening 118 and delivers the medicine cup 100 to the patient for use without the fingers F or the hand of the person dispensing the pharmaceutical product M from touching the upper edge 114 or sidewalls 108 of the cup 100 to thereby minimize the possible contamination of the cup 100 and medicine M. Referring to the embodiment shown in FIG. 1A, after use the tab 112 is broken off to clearly indicate it has been used, and the cup 100 is discarded.

Other uses for the cups 100 of this invention are contemplated, general dentistry, root canal procedures, dental implants, operating rooms, etc. and areas where contamination by the practitioner or user of the cup of the patient or the work area is of concern.

As one skilled in the art will appreciate, any desired dimension of the cup may be utilized as desired for the particular application. The shape of the cup may be of any type, circular, oval, triangular, square or a polygon of any number of sides, or any other shape, although a frustoconical cup will probably be the prevalent shape.

The invention has been described with reference to various specific and illustrative aspects of the present invention and techniques. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the appended claims.

What is claimed is:

1. A method for delivering a pharmaceutical product to a patient requiring such product in a disposable medicine cup by a person dispensing the pharmaceutical product and for retrieving and disposing of the disposable medicine cup, comprising:
    a. providing a disposable medicine cup comprising:
        i. a surrounding sidewall, the sidewall including an upper edge and a bottom edge,
        ii. a bottom wall mounted to the bottom edge of the sidewall configured to form the bottom surface of the disposable medicine cup;
        iii. the upper edge forming a top opening to the disposable medicine cup, the sidewall and bottom wall creating a volume for the disposable medicine cup; and
        iv. an infection control tab attached to and projecting from a portion of the upper edge of the surrounding sidewall, wherein the infection control tab is integrally and rigidly mounted to the sidewall, configured to the shape of the top perimeter edge of the sidewall, projecting upward therefrom as an extension of the sidewall sand configured to be grasped by two fingers of the person dispensing the pharmaceutical product or a person retrieving the disposable medicine cup,
    wherein the volume of the disposable medicine cup is suitable for holding the pharmaceutical product and delivery of the pharmaceutical product to the patient; and
    wherein the surrounding sidewall has indicia thereon denoting the volume of the pharmaceutical product for delivery, the volume for delivery being no greater than 30 ml;
    b. placing the pharmaceutical product in the disposable medicine cup through the opening;
    c. grasping the infection control tab of the disposable medicine cup by the person dispensing the pharmaceutical product;
    d. delivering the disposable medicine cup to the patient for use;
    e. retrieving the disposable medicine cup from the patient after the pharmaceutical product is delivered to the patient by the person retrieving the disposable medicine cup by grasping the infection control tab of the disposable medicine cup; and
    f. disposing of the disposable medicine cup,
    wherein the fingers or hand of the person dispensing the pharmaceutical product or the person retrieving and disposing of the disposable medicine cup do not touch the upper edge or sidewalls of the disposable, medicine cup thereby minimizing any possible contamination of the disposable medicine cup and medicine by the person dispensing the pharmaceutical product and minimizes contamination of the person dispensing the pharmaceutical product by the patient or the person retrieving and disposing of the disposable medicine cup.

2. The method of claim 1 wherein the top opening, bottom wall, sidewall and infection control tab are configured to permit the disposable medicine cup to be stacked within another identically shaped disposable medicine cup.

3. The method of claim 1, wherein the top opening, bottom wall, and sidewall are configured as a frustoconical shaped disposable medicine cup to permit the disposable medicine cup to be stacked within an identically shaped disposable medicine cup.

4. The method of claim 1, wherein the surrounding wall, the top opening and bottom surface are substantially cylindrical.

5. The method of claim 1, wherein the infection control tab has a textured frictional surface to enhance the grasp of the fingers on the tab.

6. A method for delivering a pharmaceutical product to a patient requiring such product in a disposable medicine cup, by a person dispensing the pharmaceutical product and for retrieving the disposable medicine cup, comprising:
    a. providing a disposable medicine cup having a frustoconical configuration, comprising:
        i. a closed circular base having an outer perimeter;
        ii. a conical shaped surrounding sidewall having a bottom perimeter edge joined to the outer perimeter of the circular base, and a top perimeter edge, the sidewall extending upward and tapering outwardly from the outer perimeter of the base; the sidewall and circular base creating a volume for the disposable medicine cup, and
        iii. an infection control tab attached to and projecting from a portion of the top perimeter edge of the surrounding sidewall, wherein the infection control tab is integrally and rigidly mounted to the sidewall, configured to the shape of the top perimeter edge of the sidewall, projecting upward therefrom as an extension of the sidewall and configured to be gasped by two fingers of the person dispensing the pharmaceutical product or a person retrieving the disposable medicine cup, wherein the volume of the disposable medicine cup is suitable for holding the pharmaceutical product and delivery of the pharmaceutical product to the patient; and wherein the surrounding sidewall has indicia thereon denoting the volume of the pharmaceutical product for delivery, the volume for delivery being no greater than about 30 ml;

b. placing the pharmaceutical product in the disposable medicine cup through the opening;

c. grasping the infection, control tab of the disposable medicine cup by the person dispensing the pharmaceutical product;

d. delivering the disposable medicine cup to the patient for use;

e. retrieving the disposable medicine cup from the patient after the pharmaceutical product is delivered to the patient by the person retrieving the disposable medicine cup by grasping the infection control tab of the disposable medicine cup; and f. disposing of the disposable medicine cup, wherein the fingers or hand of the person dispensing the pharmaceutical product or the person retrieving and disposing of the disposable medicine cup do not touch the upper edge or sidewalls of the disposable medicine cup thereby minimizing any possible contamination of the disposable medicine cup and medicine by the person dispensing the pharmaceutical product and minimizes contamination of the person dispensing the pharmaceutical product by the patient or the person retrieving and disposing of the disposable medicine cup.

7. The method of claim 6, wherein the top opening, bottom wall and sidewall are configured as a frustum shaped disposable medicine cup to permit the disposable medicine cup to be stacked within another identically shaped disposable medicine cup.

8. The method of claim 6, wherein the infection control tab has a textured frictional surface to enhance the grasp of the fingers on the tab.

9. The method of claim 6, wherein the disposable medicine cup is an integrally molded unit.

10. The method of claim 9, wherein the infection control tab has a textured surface to enhance the grasp of the fingers on the tab and is contoured to the shape of a thumb.

11. The method of claim 6, the infection control tab is removable from the sidewall.

12. A method for delivering a pharmaceutical product to a patient requiring such product in a disposable medicine cup, by a person dispensing the pharmaceutical product and for retrieving the disposable medicine cup, comprising:

a. providing a disposable medicine cup comprising:
   i. a surrounding sidewall, the sidewall including an upper edge and a bottom edge,
   ii. a bottom wall mounted to the bottom edge of the sidewall configured to form the bottom surface of the disposable medicine cup;
   iii. the upper edge forming a top opening to the disposable medicine cup, the sidewall and bottom wall creating a volume for the disposable medicine cup; and
   iv. an infection control tab attached to and projecting from a portion of the upper edge of the surrounding sidewall wherein the infection control tab is integrally and rigidly mounted to the sidewall, configured to the shape of the top perimeter edge of the sidewall, projecting upward therefrom as an extension of the sidewall and configured to be grasped by two fingers of the person dispensing the pharmaceutical product or a person retrieving the disposable medicine cup,
      wherein the volume of the disposable medicine cup is suitable for holding the pharmaceutical product and delivery of the pharmaceutical product to the patient; and
      wherein the surrounding sidewall has indicia thereon denoting the volume of the pharmaceutical product for delivery;

b. placing the pharmaceutical product in the disposable medicine cup through the opening;

c. grasping the infection control tab of the disposable medicine cup by the person dispensing the pharmaceutical product;

d. delivering the disposable medicine cup to the patient for use;

e. retrieving the disposable medicine cup from the patient after the pharmaceutical, product is delivered to the patient by the person retrieving the disposable medicine cup by grasping the infection control tab of the disposable medicine cup; and f. disposing of the disposable medicine cup, wherein the fingers or hand of the person dispensing the pharmaceutical product or the person retrieving and disposing of the disposable medicine cup do not touch the upper edge or sidewalls of the disposable medicine cup thereby minimizing any possible contamination of the disposable medicine cup and medicine by the person dispensing the pharmaceutical product and minimizes contamination of the person dispensing the pharmaceutical product by the patient or the person retrieving and disposing of the disposable medicine cup.

* * * * *